United States Patent [19]

Shimomura et al.

[11] Patent Number: 5,837,754
[45] Date of Patent: Nov. 17, 1998

[54] INK FOR INK JET PRINTER

[75] Inventors: Tetsuo Shimomura; Satoshi Maeda; Yozo Yamada, all of Ohtsu, Japan

[73] Assignee: Toyo Boseki Kabushiki Kaisha, Osaka, Japan

[21] Appl. No.: 726,338

[22] Filed: Oct. 3, 1996

Related U.S. Application Data

[63] Continuation of Ser. No. 369,669, Jan. 6, 1995, abandoned.

[30] Foreign Application Priority Data

Jan. 6, 1994 [JP] Japan .................................. 6-000244
Mar. 28, 1994 [JP] Japan .................................. 6-057176

[51] Int. Cl.$^6$ ...................................................... C09D 11/10
[52] U.S. Cl. ......................... 523/161; 523/160; 524/284; 524/514; 524/845; 260/DIG. 38; 106/31.13; 106/31.25
[58] Field of Search ................................ 523/161, 160; 260/DIG. 38; 106/20 D, 31.13, 31.25; 524/284, 514, 845

[56] References Cited

U.S. PATENT DOCUMENTS

| | | | |
|---|---|---|---|
| 3,846,141 | 11/1974 | Ostergren et al. | 106/22 H |
| 4,101,329 | 7/1978 | Loock | 106/22 D |
| 4,196,007 | 4/1980 | Mansukhani | 106/22 B |
| 4,246,154 | 1/1981 | Yao | 524/88 |
| 4,279,653 | 7/1981 | Makishima et al. | 106/22 R |
| 4,476,271 | 10/1984 | Kano et al. | 524/377 |
| 5,352,521 | 10/1994 | Hotta et al. | 428/402 |

FOREIGN PATENT DOCUMENTS

| | | |
|---|---|---|
| 54-58504 | 5/1979 | Japan . |
| 55-18412 | 2/1980 | Japan . |
| 60-49070 | 3/1985 | Japan . |
| 62-32159 | 2/1987 | Japan . |
| 62-124166 | 6/1987 | Japan . |
| 3-250069 | 11/1991 | Japan . |
| 4-18462 | 1/1992 | Japan . |

OTHER PUBLICATIONS

R. Wong et al., "Sterically Stabilized Polymer Colloids and Their Use as Ink–Jet Inks," *Journal of Imaging Technology*, vol. 14, No. 5, pp. 129–131 (1988).

*Primary Examiner*—Marion E. McCamish
*Assistant Examiner*—John J. Guarriello
*Attorney, Agent, or Firm*—Fish & Neave

[57] ABSTRACT

Ink for an ink-jet printer of the present invention includes polyester particles colored with a colorant which are dispersed in an aqueous medium.

2 Claims, No Drawings

INK FOR INK JET PRINTER

This is a continuation, of application Ser. No. 08/369,669, filed Jan. 6, 1995, now abandoned.

BACKGROUND OF THE INVENTION

1. Field of the Invention

The present invention relates to ink for an ink-jet printer.

2. Description of the Related Art

Various output systems have been used for information equipment such as a computer. Examples of the output systems include dot-matrix printing, thermal transfer printing, laser printing, and ink-jet printing. Among them, the ink-jet printing has been promising because of its low running cost and easy color-printing with high precision.

According to the ink-jet printing, fine ink droplets are discharged from a nozzle to be printed directly on a material to be recorded such as a sheet of paper. Considering the discharge of ink from the nozzle, ink used for the ink-jet printing is required to have physical properties such as a low viscosity and a certain degree of surface tension.

In the past, a dye solution has mainly been used as ink for an ink-jet printer utilizing the ink-jet printing as described above. An organic solvent dye solution is not preferable for a personal use or an office use in terms of safety for operators, so that ink made of a water-soluble dye solution, i.e., a combination of an aqueous medium and an aqueous dye, is mainly used. Water-soluble dye ink generally contains the following components:

An anionic water-soluble dye such as an acidic dye and a direct dye;

Water;

A humectant such as glycols, glycerine, alkylamines, and alkanolamines for preventing the clogging of the nozzle with dried ink; and Other additives such as a pH adjustor, an antiseptic agent, and a surface tension adjustor.

The above-mentioned water-soluble dye ink is described in U.S. Pat. Nos. 3,846,141, 4,279,653, 4,196,007, and 4,101,329. Such a water-soluble dye ink generally has a viscosity of several cps and a surface tension of 40 to 50 dyn/cm.

As described above, the water-soluble dye ink contains water as a medium and a humectant, so that the ink is slow in drying after being printed on a recording sheet. The ink rapidly permeates into the recording sheet due to capillarity of paper fibers, so that the apparent drying rate of the ink is increased. However, the ink runs on the recording sheet (for example, thicken recorded dots and feathering occur) to decrease printing quality and deteriorate a recorded image quality. Furthermore, an image obtained by using the water-soluble dye ink has inferior water resistance because it contains a water-soluble dye as a coloring material. This causes some problems. A recorded image is damaged with spilled water; a recorded image is spread or feathered with sweat or the like; and hands and fingers become dirty with a wet recorded image. Furthermore, after the ink is printed on the recording sheet, the water-soluble dye is dried to be fixed on the surface of paper fibers of the recording sheet; therefore, high fastness and high resistance to light are difficult to achieve.

In order to overcome the above-mentioned problems involved in the water-soluble dye ink, such as spreading or feathering, low resistance to water, and low resistance to light, a number of ideas have been proposed. For example, Japanese Laid-Open Patent Publication No. 62-124166 discloses ink containing a water-soluble dye dissolved in a mixed solution of water and an organic solvent so as to achieve a concentration of the dye of 5% by weight or less, in which the content of the organic solvent is in the range of 3 to 30% by weight. Japanese Laid-Open Patent Publication No. 62-32159 discloses ink containing a specific diether compound. Japanese Laid-Open Patent Publication No. 60-49070 discloses ink containing a water-soluble direct dye or an acidic dye, from which a surfactant is removed with an adsorption resin. These prior arts are intended for improving printing precision by controlling the properties of the water-soluble dye ink such as surface tension, viscosity, and a drying rate to regulate an ink-permeated state on the recording sheet, thereby reducing spreading or feathering of the ink. In spite of these attempts, it is difficult for the actual application of these inks to cope with all types of recording sheets, respectively having various surface states. Such being the case, a remarkable improvement of printing precision has not been attained. Furthermore, no satisfactory effects can be expected from these prior arts, with respect to resistance to water and resistance to light of a recorded image.

Another proposition has been made regarding ink containing polymer fine particles, such as ink containing a latex and an emulsion. For example, Japanese Laid-Open Patent Publication No. 55-18412 discloses ink containing a synthetic rubber latex such as a styrene-butadiene copolymer latex, an acrylonitrile-butadiene copolymer resin latex, polychloroprene latex, and butyl rubber latex; or a synthetic resin latex such as a polyacrylate resin latex, a vinyl acetate latex, a vinyl chloride latex, and a vinylidene chloride latex (all of which are latexes of vinyl polymer resin). This publication discloses generally known oil-soluble or water-soluble dyes and pigments in a wide range and discloses a water-soluble dye ink. According to this publication, ink adheres to a recording sheet and a liquid medium containing a dye permeates into the recording sheet, whereby an image and letters are printed on the recording sheet. During a subsequent drying step, a non-colored latex forms a film on the surface of the recording sheet. The film thus formed protects the surface of the recorded portion of the sheet; as a result, resistance to water, resistance to light, and resistance to abrasion of the recorded image and letters can be improved.

As described above, according to the ink disclosed in the publication, resistance to water and resistance to friction of the recorded image and letters are considered to improve to some degree. In the case where the film formed on the recording sheet has a UV-radiation blocking function, the improvement of resistance to light of the recorded image and letters can also be expected to some degree. However, this ink fails to have effects on the prevention of spreading or feathering on the recording sheet. Thus, according to this publication, the improvement of a printing quality and an image quality cannot be expected.

Fine particles dispersed ink using colored fine particles as a colorant have also been used as ink for an ink-jet printer. Examples of such fine particles dispersed ink include ink using colored polymer particles and ink using pigment particles.

For example, U.S. Pat. No. 4,246,154 and Japanese Laid-Open Patent Publication No. 54-58504 disclose a dispersion ink containing vinyl polymer fine particles dispersed in water, the particles being colored with a hydrophobic dye. This publication also discloses that the colored fine particles are formed by mixing vinyl polymer fine particles with a hydrophobic dye solution, allowing each particle to expand with the solvent of the dye solution and thus are colored with the dye contained in the dye solution. According to this publication, the hydrophobic dye is used as a colorant, so that an image to be obtained has resistance to water. In general, when a hydrophobic dye is used for ink for an ink-jet printer, an organic solvent is used as a medium. An organic solvent with a viscosity low enough to be used for this type of ink involves safety problems such as environmental contamination and ignition because of high volatility and is likely to be dried at the end of a nozzle to cause the clogging thereof. This necessitates the installation of a nozzle cleaning function, a ventilation function, etc., leading to problems such as high cost of equipment and restriction of use in an office. As countermeasures against these problems, in the method disclosed in this publication, water is used as a continuous phase and colored vinyl polymer particles expanded with an organic solvent are used as a dispersion phase. Therefore, the viscosity of the ink depends upon the viscosity of water, and thus, an organic solvent with a certain degree of high viscosity (i.e., a solvent with low volatility) can be used. This publication describes that the particle size of the dispersed polymer fine particles is required to be 0.1 $\mu$m or less. The particles with such a small size readily enter the gaps of fibers of the recording sheet. Thus, according to the method of this publication, the effects on the reduction of spreading or feathering of the ink are still insufficient. Furthermore, in general, since the compatibility between a vinyl polymer and a dye is not so high, it is difficult for the vinyl polymer to be colored with the dye at a high density. Particularly in the case where the dye is contained in a vinyl polymer at high concentrations, there is a possibility that keeping the ink for a long period of time causes the dye to be separated out of the particles of the vinyl polymer, and thus separated dye grows as a crystal in the ink and settles out as large particles. Accordingly, the above-mentioned ink fails to make it possible to obtain an image with a high density.

Japanese Laid-Open Patent Publication No. 3-250069 discloses ink containing vinyl polymer particles dispersed in an aqueous medium obtained by emulsion polymerization or dispersion polymerization. These vinyl polymer particles are colored with a dye. In this case, the ink does not contain an organic solvent; therefore, it is required for the polymer particles to be fixed on a recording sheet to form a film. This publication suggests that a desired particle size be at a submicron level for the satisfactory formation of a film and the stability of particle dispersion. According to the invention disclosed in this publication, it is difficult to color the vinyl polymer particles at a high density because of the use of the vinyl polymer and to keep the vinyl polymer particles in a stable colored state, as in Japanese Laid-Open Patent Publication No. 54-58504.

A number of articles have proposed the use of ink containing a pigment, such as carbon black, as a colorant, in which particles of the colorant are finely dispersed in an aqueous solvent by using a dispersant. In order to enhance the stability of particle dispersion in such an ink, the particles of the colorant are required to be finely dispersed so that the diameter of the particles be 0.1 $\mu$m or less. Therefore, the effects on the prevention of spreading or feathering of the ink are not sufficient. In addition, the use of the dispersant restricts the range for controlling the properties of the ink such as viscosity and surface tension, and hence, this type of ink is not suitable for ink-jet printing. Furthermore, some of the pigments used for conventional oil printing ink are insoluble, i.e., azolake pigments formed from an acidic dye and polyvalent metal. Thus, it is impossible to obtain a stable water dispersion by using such pigments because of their inferior resistance to water.

As described above, the following problems are raised with respect to the conventional ink for an ink-jet printer.
1. In aqueous dye ink, It is difficult to prevent spreading or feathering of the ink on a recording sheet, and hence, high image quality printing cannot be obtained.

The resistance to water of a recorded image is unsatisfactory.

The resistance to light of a recorded image is unsatisfactory.

2. In fine particles dispersed ink,

The above-mentioned problems involved in the water-soluble dye ink can be expected to be overcome; however, there are still problems to be solved.

i) In the case of ink using colored polymer fine particles:

The effects on the prevention of spreading or feathering of the ink are not satisfactory because of a small particle size;

High image density cannot be obtained, since it is difficult to obtain fine particles colored at a high density; and Large particles are likely to be generated in the ink because of dye bleeding from the colored particles and deposition and crystal growth of the bled dye.

ii) In the case of ink using pigment particles:

Pigment particles are required to be made fine so as to be dispersed sufficiently, which decreases the effects on the prevention of spreading or feathering of the ink; and Since a dispersant is contained, the range for controlling the physical properties of the ink is restricted.

SUMMARY OF THE INVENTION

The ink for an ink-jet printer of the present invention includes polyester particles colored with a colorant which are dispersed in an aqueous medium.

In one embodiment of the present invention, the polyester particles are made of a polyester containing an ionic group at a main chain or a side chain thereof in a range of 20 to 1000 eq/ton. As used here, eq refers to molar equivalents, and ton refers to a metric ton, or $10^6$ grams.

In another embodiment of the present invention, the colored polyester particles have an average particle size in a range of 0.1 to 1.0 $\mu$m.

In another embodiment of the present invention, the colorant is a dye which is insoluble in water at room temperature and a content of the dye in the polyester particles is in a range of 2 to 20% by weight.

In another embodiment of the present invention, the content of the colored polyester particles in the ink is in a range of 10 to 50% by weight.

In another embodiment of the present invention, the above-mentioned ink for an ink-jet printer has a surface tension in a range of 25 to 40 dyn/cm.

Thus, the invention described herein makes possible the advantages of (1) providing excellent ink for an ink-jet printer which is not spread or feathered on a recording sheet and enables high image quality printing; (2) providing excellent ink for an ink-jet printer which enables a high image density; (3) providing ink for an ink-jet printer which is excellent in storage stability and printing reliability; and (4) providing ink for an ink-jet printer which enables a recorded image excellent in resistance to water and resistance to light.

These and other advantages of the present invention will become apparent to those skilled in the art upon reading and understanding the following detailed description.

DESCRIPTION OF THE PREFERRED EMBODIMENTS

According to the present invention, colored particles obtained by coloring a polyester resin are used as a colorant of ink for an ink-jet printer. The polyester resin used in the present invention is readily colored at a high density, so that the use of such a polyester resin for the ink of the present invention enables a high image density.

The polyester resin used for colored polyester particles can be obtained by the reaction between a polyvalent carboxylic acid and a polyvalent alcohol. Examples of the polyvalent carboxylic acids used for synthesizing the polyester resin include aromatic dicarboxylic acids such as terephthalic acid, isophthalic acid, o-phthalic acid, 1,5-naphthalenedicarboxylic acid, 2, 6-naphthalenedicarboxylic acid, diphenyldicarboxylic acid, sulfoterephthalic acid, 5-sulfoisophthalic acid, 4-sulfophthalic acid, 4-sulfonaphthalene-2, 7-dicarboxylic acid, 5[4-sulfophenoxy]isophthalic acid, sulfoterephthalic acid, and metal salts thereof and ammonium salts thereof; aliphatic dicarboxylic acids such as succinic acid, adipic acid, azelaic acid, sebacic acid, and dodecanedicarboxylic acid; unsaturated aliphatic dicarboxylic acids such as fumaric acid, maleic acid, itaconic acid, hexahydrophthalic acid, and tetrahydrophthalic acid; alicyclic dicarboxylic acids such as 1,4-cyclohexanedicarboxylic acid; and polyvalent carboxylic acids with three or more valences such as trimellitic acid, trimesic acid, and pyromellitic acid. In place of these polyvalent carboxylic acids and polyvalent alcohols, aromatic hydroxycarboxylic acids such as p-hydroxybenzoic acid and p-(hydroxyethoxy)benzoic acid can be used.

Examples of the polyvalent alcohols used for synthesizing the polyester resin include aliphatic polyvalent alcohols, alicyclic polyvalent alcohols, and aromatic polyvalent alcohols.

Examples of the aliphatic polyvalent alcohols include aliphatic diols such as ethylene glycol, propylene glycol, 1,3-propanediol, 2,3-butanediol, 1,4-butanediol, 1,5-pentanediol, 1,6-hexanediol, neopentyl glycol, diethylene glycol, dipropylene glycol, 2,2,4-trimethyl-1,3-pentanediol, polyethylene glycol, polypropylene glycol, and polytetramethylene glycol; triols such as trimethylol ethane, trimethylol propane, and glycerine: and tetraols such as pentaerythritol.

Examples of the alicyclic polyvalent alcohols include 1,4-cyclohexanediol, 1,4-cyclohexanedimethanol, spiroglycol, hydrogenated bisphenol A, ethylene oxide adducts of hydrogenated bisphenol A, propylene oxide adducts of hydrogenated bisphenol A, tricyclodecanediol, and tricyclodecanedimethanol.

Examples of the aromatic polyvalent alcohols include p-xylene glycol, m-xylene glycol, o-xylene glycol, 1,4-phenylene glycol, ethylene oxide adducts of 1,4-phenylene glycol, bisphenol A, ethylene oxide adducts of bisphenol A, and propylene oxide adducts of bisphenol A.

For the purpose of blocking a functional group present at the molecular terminus of a polyester formed by using the above-mentioned polyfunctional monomers, that is, a polyvalent carboxylic acid and a polyvalent alcohol, a monofunctional monomer can be used.

Examples of the monofunctional monomer include monocarboxylic acids such as benzoic acid, chlorobenzoic acid, bromobenzoic acid, p-hydroxybenzoic acid, sulfobenzoic acid monoammonium salt, sulfobenzoic acid monosodium salt, cyclohexylaminocarbonyl benzoic acid, n-dodecylaminocarbonyl benzoic acid, tertiary butyl benzoic acid, naphthalenecarboxylic acid, 4-methylbenzoic acid, 3-methylbenzoic acid, salicylic acid, thiosalicylic acid, phenylacetic acid, acetic acid, propionic acid, butyric acid, isobutyric acid, octanoic acid, lauric acid, stearic acid, and lower alkyl esters thereof; or monoalcohols such as aliphatic monoalcohols, aromatic monoalcohols, and alicyclic monoalcohols.

In place of or in addition to the polyester resin obtained by the reaction between a polyvalent carboxylic acid and a polyvalent alcohol as described above, lactone type polyester polyols obtained by ring opening polymerization of lactones such as $\epsilon$-caprolactone can be used as a polyester resin for forming colored polyester particles.

Examples of the preferred composition of the polyester used for ink of the present invention include the following combinations (1), (2), and (3):

(1) A combination of aromatic dicarboxylic acid and aliphatic diol;

(2) A combination of aromatic dicarboxylic acid, aliphatic diol, and alicyclic diol; and (3) A combination of alicyclic dicarboxylic acid, aliphatic diol, and alicyclic diol.

More specifically, an example of combination (1) includes terephthalic acid, isophthalic acid, ethylene glycol, and neopentyl glycol. Terephthalic acid and isophthalic acid are used preferably in a ratio of 50:50, and ethylene glycol and neopentyl glyol are used preferably in a ratio of 50:50. Examples of combination (2) include terephthalic acid, isophthalic acid, ethylene glycol, and cyclohexanediol; and terephthalic acid, isophthalic acid, ethylene glycol, and tricyclodecanedimethanol. Terephthalic acid and isophthalic acid are used preferably in a ratio of 50:50; and ethylene glycol and cyclohexanediol or tricyclodecanedimethanol are used in a ratio of 50:50. Examples of combination (3) include cyclohexanedicarboxylic acid, ethylene glycol, and cyclohexanediol; and cyclohexanedicarboxylic acid, ethylene glycol, and tricyclodecanedimethanol. Ethylene glycol and cyclohexanediol or tricyclodecanedimethanol are used preferably in a ratio of 50:50.

In the case where the polyester used for ink of the present invention has an ionic group as described later, a monomer having an ionic group is added to the above-mentioned composition to prepare a polyester having an ionic group.

The polyester (i.e., polyester resin) used for the ink of the present invention preferably contains an ionic group at its main chain or side chain. Because of the ionic group, the polyester particles obtained from the polyester resin are readily dispersed in an aqueous medium and are readily colored with a dye. In some cases, after the polyester particles are dispersed in the aqueous medium, the ionic group is hydrolyzed to be released from the polyester particles. However, it is also possible that the polyester particles without an ionic group can be colored with a nonionic colorant.

Examples of a compound used for introducing the ionic group into the polyester resin include monomers having an anionic group, e.g., a sulfuric group, a sulfonic group, a carboxylic group, a phosphoric group, a phosphonic group, a phosphinic group, or ammonium salts thereof or metal salts thereof; or a cationic group, e.g., primary, secondary, or tertiary amino groups, etc. Preferably, monomers having an alkali metal carboxylate group or ammonium carboxylate group, mono- or dicarboxylic acids having an anionic group such as an alkali metal sulfonate group and an ammonium sulfonate group. Examples of salts of the anionic group include an ammonium salt, a Li salt, a Na salt, a K salt, a Mg salt, a Ca salt, a Cu salt, and a Fe salt. In particular, alkali metal salts such as the K salt and the Na salt are preferred.

The introduction of an alkali metal carboxylate salt or an ammonium carboxylate salt group into the polyester resin is conducted as follows. A polyvalent carboxylic acid such as trimellitic acid anhydrate and o-phthalic anhydride is added to a reaction system in the latter stage of a reaction of a polyester synthesis to introduce a carboxyl group into the polymer terminal and the terminal carboxyl group is neutralized with a base such as sodium hydroxide, ammonia, triethylamine, dimethylaminoethanol, diethylaminoethanol, and 2,2',2"-nitrilotris(ethanol).

Alternatively, the ionic group can be Introduced into the polyester resin by using a mono- or dicarboxylic acid having an alkali metal sulfonate group or an ammonium sulfonate group. In the present invention, 5-sodium sulfoisophthalic acid or m-sodium sulfobenzoic acid is preferably used.

Furthermore, both of the carboxylate group and the sulfonate group can be introduced into the polyester resin.

The dispersibility of the polyester in water is enhanced by introducing the ionic group into the polyester as described above. Such enhancement of the dispersibility seems to be due to the following mechanism.

A salt of the ionic group is dissociated in an aqueous medium to form an electric double layer at an interface between the polyester resin and water. In the case where the polyester resin is present in the aqueous medium as fine microparticles, a static repulsion is caused between the microparticles because of the effect of the electric double layer. Thus, the microparticles are stably dispersed in the aqueous medium.

The content of the ionic group to be introduced into the polyester resin is 10 to 1000 equivalents based on one ton of the polyester resin, preferably 20 to 1000 equivalents, more preferably 20 to 500 equivalents, and still more preferably 50 to 200 equivalents. It is noted that the content of the ionic group includes that of the salt of the ionic group. In the case where the content of the ionic group is less than the predetermined amount, sufficient dispersibility of the polyester resin in water cannot be obtained. In the case where the content of the ionic group is more than the predetermined amount, the resulting ink after being dried has unsatisfactory resistance to water.

The polyester resin used in the present invention can be produced by conventional methods such as the direct method and the transesterification method, using the above-mentioned polyvalent carboxylic acid and polyvalent alcohol, preferably using the above-mentioned compound used for introducing the ionic group into the resulting polyester resin.

The ink of the present invention is a dispersion in which colored polyester particles are dispersed in an aqueous medium. The dispersion can be obtained by dissolving the polyester resin in a water-soluble organic solvent and adding water to the resulting mixture to form polyester particles. Alternatively, the dispersion can be formed by simultaneously mixing the polyester resin, the water-soluble organic solvent, and water. The water-soluble organic solvent is preferably removed by azeotropic distillation after polyester particles are formed and dispersed in the solvent. The polyester resin can be dispersed in the aqueous solvent after being colored with a colorant. Alternatively, the polyester resin can be colored with a colorant while being dispersed in the aqueous solvent. Still alternatively, the polyester resin can be colored with a colorant after being dispersed in the aqueous solvent. Preferably, the polyester resin can be colored while being dispersed or can be colored after being dispersed. In the case where the polyester particles are colored while being dispersed, the colorant can be dissolved in the water-soluble organic solvent in which the polyester resin is dispersed. In the case where the polyester particles are colored after being dispersed, the colorant can be added to the dispersion before the water-soluble organic solvent is removed. Accordingly, the ink of the present invention in which the colored polyester particles are dispersed in the aqueous medium can be obtained.

The average particle size of the polyester particles dispersed in the ink of the present invention is preferably 1.0 $\mu$m or less, more preferably 0.5 $\mu$m or less. In the case where the particle size exceeds 1.0 $\mu$m, the dispersion stability is sometimes lowered. The average particle size is preferably at least 0.1 $\mu$m. Furthermore, it is preferred that the amount of the particles with a size of less than 0.1 $\mu$m are 1% by weight or less based on the total weight of the particles. In the case where the amount of the particles with a size of less than 0.1 $\mu$m exceeds 1% by weight, the ink is likely to spread or feather. The polyester particles of the dispersion obtained by the method as described above and below has an average particle size in the range of 0.1 to 1.0 $\mu$m. The most preferred average particle size of the polyester particles is in the range of 0.1 to 0.5 $\mu$m. According to the present invention, as described above, it is preferred that the polyester has an ionic group. The ionic group allows the dispersion stability of the polyester particles to be enhanced; therefore, the polyester particles having an ionic group are satisfactorily dispersed even though they have a relatively large average particle size (i.e., 0.1 $\mu$m or more). Thus, because of the ionic group, the spreading or feathering of the ink caused by the small particle size of the polyester particles can be suppressed. The ink of the present invention is not made of a polyester solution but a dispersion, so that the ink is not likely to spreading or feathering when being applied to a recording sheet.

As described above, the dispersion of the polyester particles can be obtained by dissolving the polyester resin in the water-soluble organic solvent, followed by adding water, or by simultaneously mixing the polyester resin, the water-soluble organic solvent, and water. Examples of the water-soluble organic solvent include ethanol, isopropanol, butanol, ethylene glycol, propylene glycol, methyl cellosolve, ethyl cellosolve, butyl cellosolve, acetone, methyl ethyl ketone, tetrahydrofuran, dioxane, and mixtures thereof. As described above, the water-soluble organic solvent is removed by azeotropic distillation after the polyester particles are dispersed in the solvent. Therefore, the solvent which can be removed from water is preferable, and thus, methyl ethyl ketone, tetrahydrofuran, isopropanol, and the like are preferably used.

As described above, the polyester particles are formed by dissolving the polyester resin in the water-soluble organic solvent, followed by adding water, or by simultaneously mixing the polyester resin, the water-soluble organic solvent, and water. Preferably, the dispersion of the polyester particles are promoted by heating these mixtures. The heating temperature is in the range of 40° C. to 100° C., preferably in the range of 50° C. to 100° C., and more preferably in the range of 60° C. to 80° C. In order to make the dispersed system uniform, it is preferred that the mixtures are slowly stirred. Preferably, the polyester resin is mixed with the water-soluble organic solvent, the mixture is heated to the above-mentioned temperature range to allow the polyester resin to be rapidly dissolved in the solvent, and water heated to the above-mentioned temperature range is gradually added to the resulting solution while stirring. This mixture forms micells with the addition of water. It is considered as follows. First, when the adding amount of water is small, water-in-oil micells are formed, and then the adding amount of water increases, oil-in-water micells are formed due to the phase transition. When the mixture is further heated to remove the water-soluble organic solvent therefrom, an aqueous dispersion in which the polyester particles are dispersed can be obtained. In order to prescribe the average particle size of the dispersed polyester particles in the above-mentioned preferred range, the polyester fine particles are preferably aggregated to some degree by appropriately controlling the kind and amount of ionic groups to be introduced into the polyester resin and the kind and amount of ions present in the dispersed system.

Preferably, the water-soluble organic solvent in the dispersed system is removed after dispersing the polyester resin in the solvent to form a dispersion, as described above. The ink of the present invention, thus obtained, preferably contains almost no organic solvent or a small amount of organic solvent. This solves the safety problems caused by the presence of the organic solvent, involved in the prior art.

As polyester particles used for ink of the present invention, crosslinked polyester particles can be used. By using the crosslinked polyester particles, water resistance and solvent resistance of the resulting ink can be further enhanced.

The crosslinked polyester particles can be obtained, for example, by the following method.

First, a polyester is prepared by using a monomer including an unsaturated monomer such as fumaric acid and maleic acid. The polyester is dispersed in water by the above-mentioned process. A vinyl monomer such as styrene, acrylic ester, and methacrylic ester and an initiator such as benzoyl peroxide and azobis(isobutyronitrile) are added to the resulting water dispersion. The reaction mixture thus obtained is stirred. Consequently, the vinyl monomer is absorbed into the unsaturated polyester fine particles in the water dispersion. The reaction mixture is heated to a reaction temperature of the initiator to allow the reaction between the unsaturated polyester and the vinyl monomer to proceed, whereby the crosslinked polyester particles can be obtained. This is a kind of seed polymerization.

It is preferred that the crosslinked polyester particles are used by being mixed with a water dispersion of non-crosslinked thermoplastic polymers such as polyethylene, polystyrene, and acrylic resins.

The crosslinked polyester particles can be colored by a method described below, in the same way as in the non-crosslinked polyester particles.

Into the dispersion thus formed, a dispersant or a dispersion stabilizing agent such as a surfactant and a polymeric dispersion stabilizer can be added so as to enhance dispersibility of the polyester particles therein.

According to the present invention, the polyester particles are colored with a colorant. As the colorant for coloring the polyester resin, known dyes or pigments can be widely used. Dyes are preferably used. Examples of the dyes used in the present invention include anionic dyes such as acidic dyes, direct dyes, and food dyes; cationic dyes such as basic dyes; and dyes which are insoluble in water or have a low solubility, such as disperse dyes, oil-soluble dyes, and vat dyes. In the case where a cationic group is introduced into the polyester resin as an ionic group, the polyester resin is dyed with an anionic dye at high fastness. In the case where an anionic group is introduced into the polyester resin as an ionic group, the polyester resin is dyed with a cationic dye at high chromaticness.

In the present invention, "dyes insoluble in water at room temperature" are preferably used. These dyes are generally classified into disperse dyes or oil-soluble dyes. More specifically, at least one kind of dye selected from the following group is preferably used.

C.I. Disperse Yellow 198
C.I. Disperse Yellow 42
C.I. Disperse Yellow 162
C.I. Disperse Red 92
C.I. Disperse Red 60
C.I. Disperse Violet 26
C.I. Disperse Violet 35
C.I. Disperse Blue 60
C.I. Disperse Blue 87
C.I. Solvent Blue 25
C.I. Solvent Blue 35
C.I. Solvent Blue 38
C.I. Solvent Blue 64
C.I. Solvent Blue 70
C.I. Solvent Black 3
C.I. Solvent Yellow 93
C.I. Solvent Yellow 162
C.I. Solvent Red 49
C.I. Disperse Blue 49
C.I. Solvent Blue 67
C.I. Solvent Blue 64
C.I. Solvent Blue 44

These dyes containing the three primary colors are preferred because of their particularly excellent fastness to light, fastness to sublimation, color value, and chromaticness. Known dyes or pigments can be used together with the above-mentioned dyes for the purpose of finely controlling the hues.

As described above, the polyester resin can be dispersed in an aqueous medium after being colored with a colorant. Alternatively, the polyester resin can be colored while being dispersed in the aqueous medium. Still alternatively, the polyester resin can be colored after being dispersed in the aqueous medium. Preferably, the polyester resin can be colored while being dispersed in the aqueous medium or colored after being dispersed in the aqueous medium.

The dispersed polyester particles are colored with a dye by high-temperature dispersion dying. According to this method, a polyester and a water-insoluble dye are dispersed in an aqueous medium, and the resulting mixture is heated, whereby the dye is absorbed into the polyester particles. The heating temperature is in the range of 60° to 150° C., preferably in the range of 70° C. to 140° C., and more preferably in the range of 80° to 130° C. The dye is added when the polyester resin is dissolved in the water-soluble organic solvent or when the polyester resin, the water-soluble organic solvent, and water are mixed. Alternatively, the dye is added to the dispersed system after the polyester particles are dispersed in the aqueous medium. Still alternatively, the dye can be added to the dispersed system from which the water-soluble organic solvent has been removed.

In the case where the polyester resin has an ionic group, the polyester particles have satisfactorily stable dispersibility in water, so that the polyester particles can be colored at high density while keeping a particle shape. In general, a polyester is easy to color with an oil-soluble dye, compared with a vinyl polymer. Furthermore, in the case where the polyester resin has an ionic group, the polyester particles become easy to color with an ionic dye such as a cationic dye and an anionic dye. However, in some cases, the ionic groups are released from the polyester resin by hydrolysis after the polyester particles are dispersed in the aqueous medium. It is also possible that such a polyester resin having no ionic group is colored with an non-ionic dye.

It is preferred that the dye used for coloring the polyester is completely absorbed into polyester particles and does not remain in the aqueous medium. The content of the dye in the polyester resin fine particles is preferably in the range of 2 to 20% by weight. In the case where the content is less than 2% by weight, a satisfactory image density cannot be obtained. In the case where the content exceeds 20% by weight, the dispersion is likely to become unstable. The dye absorbed into the polyester particles is hardly deposited even after a long-term storage of the ink. Thus, according to the present invention, an ink excellent in storage stability can be obtained.

According to the present invention, the content of the colored polyester particles in the ink is preferably in the range of 10 to 50% by weight based on the total weight of the ink. In the case where the content is less than 10% by weight, a required image density cannot be obtained. In the case where the content exceeds 50% by weight, the ink (i.e., dispersion) is likely to clog a nozzle because of its increased viscosity.

It is preferred, according to the present invention, that the surface tension of the entire ink is controlled in the range of 25 dyn/cm to 40 dyn/cm by adding a material for decreasing the surface tension such as a surfactant. Within this range, water, which is a dispersing medium in the ink, is readily absorbed into a recording sheet and spreading or feathering of the ink can be markedly decreased. In the case where the surface tension of the ink is less than 25 dyn/cm, the ink spills from a print head nozzle, making it difficult to conduct satisfactory printing. In the case where the surface tension of the ink exceeds 40 dyn/cm, the ink clogs the nozzle because of its high viscosity.

Preferred examples of the surfactant to be added for decreasing the surface tension of the ink include ethanol, methanol, isopropanol, and butanol. As the surfactant for decreasing the surface tension of the ink, the same surfactant as that for enhancing dispersibility of the polyester particles can be used.

If required, compounds represented by the following Formula I and/or compounds represented by the following Formula II are added to the ink of the present invention for the purpose of enhancing resistance to light.

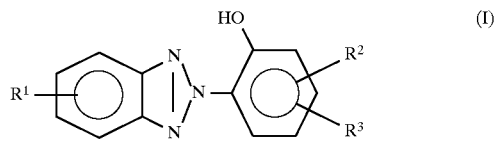

wherein $R^1$ is a hydrogen atom or a halogen atom such as chlorine and bromine; $R^2$ and $R^3$ are independently hydrogen atoms or organic substituents such as an alkyl group and a branched alkyl group having 1 to 20 carbon atoms.

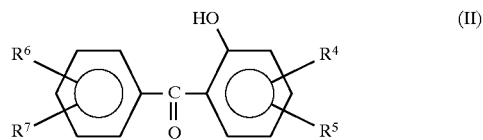

wherein $R^4$, $R^5$, $R^6$, and $R^7$ are independently hydrogen atoms; halogens; hydroxyl groups; carboxyl groups; sulfonic groups or sulfonate groups; or alkyl groups, alkoxyl groups or aryl groups having 1 to 20 carbon atoms.

Examples of the compounds represented by Formula I include 2-(5'-methyl-2'-hydroxyphenyl)benzotriazole, 2-(2'-hydroxy-3',5'-bis(α,α-dimethylbenzyl)phenyl)-2H-benzotriazole, 2-(3',5'-di-t-butyl-2'-hydroxyphenyl)benzotriazole, 2-(3'-t-butyl-5'-methyl-2'-hydoxyphenyl)-5-chlorobenzotriazole, 2-(3',5'-di-t-butyl-2'-hydroxyphenyl)-5-chlorobenzotriazole, 2-(3',5'-di-t-amyl-2'-hydroxyphenyl)benzotriazole, and 2-(2'-hydroxy-5'-t-octylphenyl)benzotriazole. It is noted that the compounds are not limited to these examples. According to the present invention, two or more kinds of the compounds represented by Formula I can be used together. In the present example, the adding amount of the compound represented by Formula I is preferably in the range of 0.5 to 5 parts by weight based on 100 parts by weight of the polyester resin.

Examples of the compounds represented by Formula II include 2,4-dihydroxybenzophenone, 2-hydroxy-4-methoxybenzophenone, 2-hydroxy-4-methoxy-5-sulfobenzophenone, 2-hydroxy-4-n-octoxybenzophenone, 2-hydroxy-4-n-dodecyloxybenzophenone, and 2-hydroxy-4-benzyloxybenzophenone. It is noted that the compounds are not limited to these examples. According to the present invention, two or more kinds of the compounds represented by Formula II can be used together. In the present example, the adding amount of the compound represented by Formula II is in the range of 0.5 to 5 parts by weight based on 100 parts by weight of the polyester resin.

As described above, if required, the surfactant and/or the polymeric dispersion stabilizer which are a dispersant or a dispersion stabilizing agent can be added to the ink for an ink-jet printer of the present invention. Moreover, for the purpose of enhancing wettability of the polyester particles, ethylene glycol, glycerine, various kinds of polyvalent alcohols, amines, or the like can be added to the ink. Various chelating agents can also be added to the ink for masking metal ions which may be mixed in the ink. Furthermore, various kinds of bactericides, antifungal agents, UV absorbers, antioxidants, or the like can be added to the ink for the purpose of enhancing storage stability of the ink.

Hereinafter, the present invention will be described by way of illustrative examples.

EXAMPLE 1

First, 130 parts by weight of dimethyl terephthalate, 56 parts by weight of dimethyl isophthalate, 6 parts by weight of 5-sodium sulfoisophthalic acid dimethyl ester, 159 parts by weight of ethylene glycol, 30 parts by weight of tricyclodecanedimethanol, and 0.1 parts by weight of tetrabutoxy titanate were placed in an autoclave equipped with a thermometer and a stirrer. The resulting mixture was subjected to transesterification by heating at 180° C. to 230° C. for 120 minutes. Then, the reaction system was further heated to 240° C. and allowed to react under a pressure of 1 to 10 mmHg for 60 minutes, thereby obtaining a polyester resin copolymer.

Next, 340 parts by weight of the obtained polyester resin copolymer, 150 parts by weight of methyl ethyl ketone, 140 parts by weight of tetrahydrofuran, and 30 parts by weight of a concentrated cake of C.I. Disperse Blue 60 (Trade Name: TS. Turquoise Blue 606 cake, manufactured by Sumitomo Chemical Co., Ltd.) as a dye were mixed and heated at 80° C. To the resulting solution, 680 parts by weight of water at 80° C. was added. The mixture thus obtained was slowly stirred to obtain an aqueous micro-dispersion of the polyester resin copolymer having an average particle size of about 0.15 µm. Particles having a size of more than 0.5 µm and less than 0.1 µm were not substantially found in the dispersion. The particle size was measured by using a Coulter Model N4. The aqueous micro-dispersion thus obtained was placed in a flask for distillation and distilled until the temperature of the distillate reached 100° C. Thereafter, the resulting aqueous micro-dispersion was cooled, and water was added thereto so that the concentration of a solid content was 30% by weight.

Separately, aqueous micro-dispersions were obtained in the same manner as the above by using the following dyes:

C.I. Solvent Yellow 93 (Trade Name: Macrolex Yellow 3G, manufactured by Bayer A. G.)

C.I. Disperse Red 60 (Trade Name: Miketon Polyester Red FB conc. cake, manufactured by Mitsui Toatsu Dyestuff)

The aqueous micro-dispersions thus obtained were used as ink for an ink-jet printer (HG-4000, manufactured by EPSON). Recording sheets which were not processed for ink-jet printing were used. As a result, sharpened images were obtained at a high density without any spreading or feathering of the ink. These aqueous micro-dispersions did not form a precipitate and the dyes were not deposited therefrom, even though they were allowed to stand at room temperature for three or more months. Thus, these aqueous micro-dispersions showed good stability.

Water droplets were dropped onto the printed sheet so as to evaluate water resistance, indicating that nothing was changed.

Comparative Example 1

First, 500 parts by weight of water, 200 parts by weight of styrene, 10 parts by weight of sodium styrenesulfonate, 10 parts by weight of a concentrated cake of C.I. Disperse Blue 60 as a disperse dye, and 10 parts by weight of potassium persulfate were placed in a 1 liter-separable flask. The resulting mixture was allowed to react at 70° C. for 18 hours to obtain an emulsion of colored styrene particles.

The emulsion thus obtained was placed in a beaker and allowed to stand still for about 30 minutes to form a precipitate of crystal particles of the dye in the bottom of the beaker. The total amount of the collected dye corresponds to about 70% of the dye which had been first placed in the flask. The colored density of the crystal particles was low. The crystal particles of the precipitated dye were removed from the emulsion, and the emulsion was allowed to stand at room temperature for three months. As a result, crystal particles of the dye were deposited again in the bottom of the flask.

Comparative Example 2

Spreading or feathering of ink was checked with an aqueous dye used for conventional ink for ink-jet printing. Thirty grams of each of the following aqueous dyes was dissolved in 1000 ml of water to obtain inks.

C.I. Acid Yellow 7
C.I. Acid Red 94
C.I. Acid Blue 1

Satisfactory images were obtained without any feathering of the ink in the case of using recording sheets processed for ink-jet printing; however, these inks spread in the case of using plain paper for electrophotographic copier.

The comparison was also made between these inks and the inks of Example 1 with respect to resistance to light as follows. An image which had been printed out on the sheets by the use of each ink was irradiated by using a UV-rays carbon-arc fadeometer at 63° C. for 20 hours, and the difference in color of the ink before and after irradiation was measured. As a result, the inks of Example 1 showed ΔE of 3 to 5, and the inks of Comparative Example 2 were faded to a large degree, showing ΔE of 8 to 40.

Water droplets were dropped onto the printed sheet so as to evaluate water resistance. As a result, the ink was eluted into the water droplets, making it difficult to read letters on the printed sheet.

EXAMPLE 2

First, 140 parts by weight of dimethyl terephthalate, 140 parts by weight of dimethyl isophthalate, 11 parts by weight of 5-sodium sulfoisophthalic acid dimethyl ester, 102 parts by weight of ethylene glycol, and 172 parts by weight of neopentyl glycol were placed in an autoclave equipped with a thermometer and a stirrer. The resulting mixture was subjected to transesterification by heating at 180° C. to 230° C. for 120 minutes. Then, the reaction system was further heated to 240° C. and allowed to react under a pressure of 1 to 10 mmHg for 60 minutes, thereby obtaining a polyester resin copolymer.

Next, 150 parts by weight of the obtained polyester resin copolymer, 150 parts by weight of methyl ethyl ketone, 150 parts by weight of tetrahydrofuran, and 15 parts by weight of C.I. Solvent Blue 70 as a dye were mixed and heated at 80° C. To the resulting solution, 600 parts by weight of water at 75° C. were added. The mixture thus obtained was slowly stirred to obtain an aqueous micro-dispersion of the polyester resin copolymer having an average particle size of about 0.15 µm. Particles having a size of 0.7 µm or more and less than 0.1 µm were not substantially found in the dispersion. The aqueous micro-dispersion thus obtained was placed in a flask for distillation and distilled until the temperature of a distillate reached 100° C. Thereafter, the aqueous micro-dispersion was cooled, and water was added thereto so that the solid content was 20% by weight. The surface tension of the aqueous micro-dispersion was about 60 dyn/cm. In order to decrease the surface tension, ethylene glycol was added to the dispersion so that the concentration of the ethylene glycol in water was 10% by weight. As a result, the surface tension became 40 dyn/cm.

The aqueous micro-dispersion thus obtained was used as ink for an ink-jet printer (IO-735X manufactured by Sharp Kabushiki Kaisha). Recording sheets which were not processed for ink-jet printing were used. As a result, sharpened images were obtained at a high density without any spreading or feathering of the ink. This aqueous micro-dispersion did not form a precipitate and the dye was not deposited therefrom, even though it was allowed to stand at room temperature for three or more months. Thus, this aqueous micro-dispersion showed good stability.

EXAMPLE 3

First, 130 parts by weight of dimethyl terephthalate, 56 parts by weight of dimethyl isophthalate, 6 parts by weight of 5-sodium sulfoisophthalic acid dimethyl ester, 159 parts by weight of ethylene glycol, 268 parts by weight of neopentyl glycol, and 0.1 parts by weight of tetrabutoxy titanate were placed in an autoclave equipped with a thermometer and a stirrer. The resulting mixture was subjected to transesterification by heating at 180° C. to 230° C. for 120 minutes. Then, the reaction system was further heated to 240° C. and allowed to react under a pressure of 1 to 10 mmHg for 60 minutes, thereby obtaining a polyester resin copolymer.

Next, 100 parts by weight of the polyester resin copolymer, 175 parts by weight of methyl ethyl ketone, 175 parts by weight of tetrahydrofuran, and 10 parts by weight of C.I. Solvent Blue 64 as a dye were mixed and heated at 80° C. To the resulting solution, 600 parts by weight of water at 80° C. were added. The mixture thus obtained was slowly stirred to obtain an aqueous micro-dispersion of the polyester resin copolymer having an average particle size of about 0.33 $\mu$m. Particles having a size of 1.0 $\mu$m or more and 0.1 $\mu$m or less were not substantially found in the dispersion. The amount of the particles having a size of 0.1 $\mu$m or less was 1% by weight or less. The aqueous micro-dispersion thus obtained was placed in a flask for distillation and distilled until the temperature of a distillate reached 100° C. Thereafter, the aqueous micro-dispersion was cooled, and water was added thereto so that the solid content was 30% by weight.

Separately, aqueous micro-dispersions were obtained in the same manner as the above by using the following dyes:

C.I. Solvent Yellow 162

C.I. Disperse Red 92

Ethylene glycol was added as a humectant to these aqueous micro-dispersions so that the concentration of the ethylene glycol in water was 10% by weight.

The aqueous micro-dispersions thus obtained were used as ink for an ink-jet printer (HG-4000, manufactured by EPSON). Recording sheets which were not processed for ink-jet printing were used. As a result, sharpened images were obtained at a high density without any spreading or feathering of the ink. These aqueous micro-dispersions did not form a precipitate and the dyes were not deposited therefrom, even though they were allowed to stand at room temperature for three or more months. Thus, these aqueous micro-dispersions showed good stability.

EXAMPLE 4

First, 130 parts by weight of dimethyl terephthalate, 56 parts by weight of dimethyl isophthalate, 16 parts by weight of 5-sodium sulfoisophthalic acid dimethyl ester, 159 parts by weight of ethylene glycol, 30 parts by weight of tricyclodecanedimethanol, and 0.1 parts by weight of tetrabutoxy titanate were placed in an autoclave equipped with a thermometer and a stirrer. The resulting mixture was subjected to transesterification by heating at 180° C. to 230° C. for 120 minutes. Then, the reaction system was further heated to 240° C. and allowed to react under a pressure of 1 to 10 mmHg for 60 minutes, thereby obtaining a polyester resin copolymer.

Next, 340 parts by weight of the polyester resin copolymer, 150 parts by weight of methyl ethyl ketone, 140 parts by weight of tetrahydrofuran, 30 parts by weight of a concentrated cake of C.I. Disperse Blue 60 as a dye, and 4 parts by weight of 2-(5'-methyl-2'-hydroxyphenyl)benzotriazole were mixed and heated at 80° C. To the resulting solution, 680 parts by weight of water at 80° C. were added. The mixture thus obtained was slowly stirred to obtain an aqueous micro-dispersion of the polyester resin copolymer having an average particle size of about 0.50 $\mu$m. Particles having a size of 1.0 $\mu$m or more and 0.1 $\mu$m or less were not substantially found in the dispersion. The aqueous micro-dispersion thus obtained was placed in a flask for distillation and distilled until the temperature of the distillate reached 100° C. Thereafter, the aqueous micro-dispersion was cooled, and water was added thereto so that the concentration of a solid content was 30% by weight.

Separately, aqueous micro-dispersions were obtained in the same manner as the above by using the following dyes:

C.I. Disperse Yellow 198

C.I. Disperse Red 92

The aqueous micro-dispersions thus obtained were used as ink for an ink-jet printer (HG-4000, manufactured by EPSON). Recording sheets which were not processed for ink-jet printing were used. As a result, sharpened images were obtained at a high density without any spreading or feathering of the ink. These aqueous micro-dispersions did not form a precipitate and the dyes were not deposited therefrom, even though they were allowed to stand at room temperature for three or more months. Thus, these aqueous micro-dispersions showed good stability.

EXAMPLE 5

First, 190 parts by weight of cyclohexanedicarboxylic acid dimethyl ester, 26 parts by weight of 5-sodium sulfoisophthalic acid dimethyl ester, 159 parts by weight of ethylene glycol, 30 parts by weight of tricyclodecanedimethanol, and 0.1 parts by weight of tetrabutoxy titanate were placed in an autoclave equipped with a thermometer and a stirrer. The resulting mixture was subjected to transesterification by heating at 180° C. to 230° C. for 120 minutes. Then, the reaction system was further heated to 240° C. and allowed to react under a pressure of 1 to 10 mmHg for 60 minutes, thereby obtaining a polyester resin copolymer. The specific gravity of the polyester resin was 1.16.

Next, 340 parts by weight of the polyester resin copolymer, 150 parts by weight of methyl ethyl ketone, 140 parts by weight of tetrahydrofuran, 30 parts by weight of C.I. Solvent Blue 70 as a dye, and 4 parts by weight of 2,4-dihydroxybenzophenone were mixed and heated at 80° C. To the resulting solution, 680 parts by weight of water at 80° C. were added. The mixture thus obtained was slowly stirred to obtain an aqueous micro-dispersion of the polyester resin copolymer having an average particle size of about 0.45 $\mu$m. Particles having a size of 1.0 $\mu$m or more and 0.1 $\mu$m or less were not substantially found in the dispersion. The aqueous micro-dispersion thus obtained was placed in a flask for distillation and distilled until the temperature of the distillate reached 100° C. Thereafter, the aqueous micro-dispersion was cooled, and water was added thereto so that the solid content was 30% by weight.

Separately, aqueous micro-dispersions were obtained in the same manner as the above by using the following dyes:

C.I. Disperse Yellow 198

C.I. Disperse Red 92

The aqueous micro-dispersions thus obtained were used as ink for an ink-jet printer (HG-4000, manufactured by EPSON). Recording sheets which were not processed for ink-jet printing were used. As a result, sharpened images were obtained at a high density without any spreading or feathering of the ink. These aqueous micro-dispersions did not form a precipitate and the dyes were not deposited therefrom, even though they were allowed to stand at room temperature for three or more months. Thus, these aqueous micro-dispersions showed good stability.

EXAMPLE 6

First, 120 parts by weight of dimethyl terephthalate, 160 parts by weight of dimethyl isophthalate, 14 parts by weight of 5-sodium sulfoisophthalic acid dimethyl ester, 102 parts by weight of ethylene glycol, and 172 parts by weight of neopentyl glycol were placed in an autoclave equipped with a thermometer and a stirrer. The resulting mixture was subjected to transesterification by heating at 180° C. to 230° C. for 120 minutes. Then, the reaction system was further heated to 240° C. and allowed to react under a pressure of 1 to 10 mmHg for 60 minutes, thereby obtaining a polyester resin copolymer.

Next, 150 parts by weight of the polyester resin copolymer, 100 parts by weight of methyl ethyl ketone, 50 parts by weight of tetrahydrofuran, and 15 parts by weight of a concentrated cake of Spilon Blue 2BNH (manufactured by Hodogaya Chemical Co., Ltd.) as a dye were mixed and heated at 80° C. To the resulting solution, 600 parts by weight of water at 75° C. were added. The mixture thus obtained was slowly stirred to obtain an aqueous micro-dispersion of the polyester resin copolymer having an average particle size of about 0.15 μm. The aqueous micro-dispersion thus obtained was placed in a flask for distillation and distilled until the temperature of a distillate reached 100° C. Thereafter, the aqueous micro-dispersion was cooled, and water was added thereto so that the solid content was 20% by weight.

The aqueous micro-dispersion thus obtained was used as ink for an ink-jet printer (IO-735X, manufactured by Sharp Kabushiki Kaisha). Recording sheets which were not processed for ink-jet printing were used. As a result, sharpened images were obtained at a high density without any spreading or feathering of the ink. This aqueous micro-dispersion did not form a precipitate and the dye was not deposited therefrom, even though it was allowed to stand at room temperature for three or more months. Thus, this aqueous micro-dispersion showed good stability.

EXAMPLE 7

First, 136 parts by weight of dimethyl terephthalate, 56 parts by weight of dimethyl isophthalate, 68 parts by weight of ethylene glycol, 175 parts by weight of an ethylene oxide adduct of bisphenol A (average molecular weight: 350), and 0.1 parts by weight of tetrabutoxy titanate were placed in an autoclave equipped with a thermometer and a stirrer. The resulting mixture was subjected to transesterification by heating at 150° C. to 220° C. for 180 minutes. Then, the reaction system was further heated to 240° C., gradually depressurized to 10 mmHg over 30 minutes, and allowed to react for 60 minutes. Nitrogen gas was introduced into the autoclave to produce atmospheric pressure therein. Eight parts by weight of trimellitic anhydride were added to the resulting mixture in the autoclave while keeping the temperature of the autoclave at 200° C., and the mixture was allowed to react for 60 minutes to obtain a polyester resin copolymer. The acid value of the polyester resin copolymer was 3.8 KOHmg.

The analysis of the resulting polyester resin copolymer by NMR revealed that the polyester resin copolymer contained, as an acid component, 70 mol% of terephthalic acid, 29 mol% of isophthalic acid, and 1 mol% of trimellitic acid, and, as a glycol component, 50 mol% of ethylene glycol and 50 mol% of an ethylene oxide adduct of bisphenol A.

Next, 200 parts by weight of the polyester resin copolymer thus obtained, 100 parts by weight of methyl ethyl ketone, and 50 parts by weight of tetrahydrofuran were mixed. The resulting mixture was heated at 80° C., and the resulting solution was cooled to 70° C. Seven parts by weight of 2,2',2"-nitrilotris(ethanol) were added to the solution, and the solution was stirred for 30 minutes at 70° C. To this solution, 20 parts by weight of a concentrated cake of Spilon Blue 2BNH as a dye were added. Five hundred parts by weight of water at 75° C. were added to the resulting mixture while stirring at 80° C., followed by stirring another 30 minutes. The average particle size of the colored polyester dispersion thus obtained was 0.20 μm. Particles having a size of 0.5 μm or more and less than 0.1 μm were not substantially found in the dispersion. The dispersion was placed in a flask for distillation and distilled until the temperature of the distillate reached 100° C. Thereafter, the dispersion was cooled, and water was added thereto so that the solid content was 22% by weight.

The aqueous micro-dispersion thus obtained was used as ink for an ink-jet printer (IO-735X, manufactured by Sharp Kabushiki Kaisha). Recording sheets which were not processed for ink-jet printing were used. As a result, sharpened images were obtained at a high density without any spreading or feathering of the ink. This aqueous micro-dispersion did not form a precipitate and the dye was not deposited therefrom, even though it was allowed to stand at room temperature for three or more months. Thus, this aqueous micro-dispersion showed good stability.

EXAMPLE 8

First, 98 parts by weight of 1,4-cyclohexanedicarboxylic acid dimethyl ester, 68 parts by weight of fumaric acid, 68 parts by weight of ethylene glycol, 110 parts by weight of 1,4-cyclohexanediol, and 0.1 parts by weight of tetrabutoxy titanate were placed in an autoclave equipped with a thermometer and a stirrer. The resulting mixture was subjected to transesterification by heating at 150° C. to 220° C. for 180 minutes. Then, the reaction system was further heated to 240° C., gradually depressurized to 10 mmHg over 30 minutes, and allowed to react for 60 minutes. Nitrogen gas was introduced into the autoclave to produce atmospheric pressure therein. Sixteen parts by weight of ortho-phthalic anhydride were added to the resulting mixture in the autoclave while keeping the temperature of the autoclave at 200° C., and the mixture was allowed to react for 60 minutes to obtain a polyester resin copolymer. The acid value of the polyester resin copolymer was 4.0 KOHmg.

The analysis of the resulting polyester resin copolymer by NMR revealed that the polyester resin copolymer contained, as an acid component, 50 mol% of 1,4-cyclohexanedicarboxylic acid, 50 mol% of fumaric acid, 50 mol% of ethylene glycol, and 50 mol% of 1,4-cyclohexanediol.

Next, 200 parts by weight of the polyester resin copolymer thus obtained, 100 parts by weight of methyl ethyl ketone, and 50 parts by weight of tetrahydrofuran were mixed. The resulting mixture was heated at 80° C., and the resulting solution was cooled to 70° C. Seven parts by weight of 2,2',2"-nitrilotris(ethanol) were added to the solution, and the solution was stirred for 30 minutes at 70° C. To this solution, 20 parts by weight of a concentrated cake of Spilon Blue 2BNH as a dye were added. Five hundred parts by weight of water at 75° C. were added to the resulting mixture while stirring at 80° C., followed by stirring another 30 minutes. The average particle size of the colored polyester dispersion thus obtained was 0.20 μm. Particles having a size of 0.5 μm or more and less than 0.1 μm were not substantially found in the dispersion. The dispersion was placed in a flask for distillation and distilled until the temperature of the distillate reached 100° C. Thereafter, the dispersion was cooled, and water was added thereto so that the solid content was 22% by weight.

One hundred parts by weight of styrene containing 2% by weight of α,α'-azoiso-butyronitrile were added to 1000 parts by weight of the colored polyester dispersion thus obtained. The resulting mixture was stirred under nitrogen atmosphere at room temperature for 2 hours, and then, the mixture was heated to 80° C. to be allowed to react for 5 hours, thereby obtaining a dispersion containing colored crosslinked polyester particles. The dispersion has a solid content of 30%.

Five hundred parts by weight of the resulting dispersion, 200 parts by weight of polyolefine emulsion (Chemipearl S-100, manufactured by Mitsui Petrochemical Industries, Ltd.), and 100 parts by weight of deionized water were mixed to obtain ink for ink-jet printing. Plain paper for electrophotographic copier was printed with the ink thus obtained. As a printer, IO-735X (manufactured by Sharp Kabushiki Kaisha) was used. The printed sheet was placed in an oven at 100° C. for 60 seconds so as to fix letters thereon. As a result, sharpened images were obtained at a high density without any spreading or feathering of the ink. Even though water droplets were dropped onto the printed paper, nothing was changed, indicating good water resistance of the ink. This aqueous micro-dispersion did not form a precipitate and the dye was not deposited therefrom, even though it was allowed to stand at room temperature for three or more months. Thus, this aqueous micro-dispersion showed good stability.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. Ink for an ink-jet printer comprising polyester particles colored with a colorant and dispersed in an aqueous medium, wherein:

(a) the polyester particles are made of a polyester containing an ionic group on a main chain or a side chain of the polyester in the range of 20 to 1000 equivalents/ $10^6$ g;

(b) the polyester particles have an average particle size in the range of 0.1 to 1.0 μm;

(c) the colorant is a dye which is insoluble in water at room temperature;

(d) the content of the dye in the polyester particles is in the range of 2 to 20% by weight; and (e) the ink for the ink-jet printer has a surface tension in a range of 25 to 40 dyne/cm.

2. Ink for an ink-jet printer according to claim 1, wherein the content of the colored polyester particles in the ink is in a range of 10 to 50% by weight.

* * * * *